(12) United States Patent
Nakamura

(10) Patent No.: US 8,168,020 B2
(45) Date of Patent: May 1, 2012

(54) PNEUMATIC TIRE AND ITS FABRICATING METHOD

(75) Inventor: Norihiko Nakamura, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 854 days.

(21) Appl. No.: 12/180,639

(22) Filed: Jul. 28, 2008

(65) Prior Publication Data

US 2009/0032159 A1 Feb. 5, 2009

(30) Foreign Application Priority Data

Aug. 1, 2007 (JP) ................................. 2007-201193

(51) Int. Cl.
*B29C 33/68* (2006.01)
*B29C 35/02* (2006.01)
*B29C 59/02* (2006.01)
*B60C 13/00* (2006.01)

(52) U.S. Cl. ..................... 156/110.1; 156/219; 152/523; 264/293; 264/316

(58) Field of Classification Search ............... 156/110.1, 156/116, 219; 152/523, 524; 264/293, 316
See application file for complete search history.

(56) References Cited

U.S. PATENT DOCUMENTS

| | | | |
|---|---|---|---|
| 3,285,314 A | 11/1966 | Roberts | |
| 3,761,338 A * | 9/1973 | Ungar et al. | .................. 156/219 |
| 4,444,713 A | 4/1984 | Egan et al. | |
| 5,058,648 A | 10/1991 | Kansupada | |
| 5,527,407 A | 6/1996 | Gartland et al. | |
| 6,235,376 B1 | 5/2001 | Miyazaki et al. | |
| 2003/0230370 A1 | 12/2003 | Stubbendieck et al. | |
| 2004/0103967 A1* | 6/2004 | Majumdar et al. | ............ 152/450 |
| 2005/0087725 A1 | 4/2005 | Kanakkanatt | |
| 2005/0109440 A1 | 5/2005 | Majumdar et al. | |
| 2006/0083940 A1 | 4/2006 | Bekele | |
| 2009/0032172 A1 | 2/2009 | Nakamura | |
| 2009/0032173 A1 | 2/2009 | Nakamura | |
| 2009/0032174 A1 | 2/2009 | Nakamura | |

FOREIGN PATENT DOCUMENTS

| | | |
|---|---|---|
| EP | 1073031 | 1/2001 |
| JP | 63-302030 | 12/1988 |
| JP | 64-016407 | 1/1989 |
| JP | 03-292205 | 12/1991 |
| JP | 06-106921 | 4/1994 |
| JP | 06-258515 | 9/1994 |
| JP | 07-096719 | 4/1995 |
| JP | 3061600 | 6/1999 |
| JP | 11-286060 | 10/1999 |

(Continued)

OTHER PUBLICATIONS

Machine Translation of KR 10-2005-0045220. Date Unknown.*

(Continued)

*Primary Examiner* — Michael Tolin
(74) *Attorney, Agent, or Firm* — Fish & Richardson P.C.

(57) ABSTRACT

Two kinds or more of resin films having different surface roughnesses are pasted to an outer surface of a side portion of an unvulcanized tire, the unvulcanized tire is vulcanized and molded in a state of pasting the resin films, thereby, a pneumatic tire provided with two kinds or more of the resin films at the outer surface of the tire side portion to be able to be exfoliated therefrom is fabricated.

11 Claims, 5 Drawing Sheets

FOREIGN PATENT DOCUMENTS

| | | | |
|---|---|---|---|
| JP | 2000-142026 | | 5/2000 |
| JP | 2002-241705 | | 8/2002 |
| JP | 2006-143889 | | 6/2006 |
| KR | 10-2005-0045220 | * | 5/2005 |

OTHER PUBLICATIONS

Archived web pages http://www.maropolymeronline.com/Properties/modulus_values.asp (archive date Jun. 16, 2002), http://www.maropolymeronline.com/Properties/nylon_66_properties.asp (archive date Jun. 16, 2002), http://www.maropolymeronline.com/Properties/Nylon%206.asp (archive date Dec. 25, 2002); all accessed from web.archive.org on Oct. 14, 2011.

C.A. Harper, ed., Modern Plastics Handbook, ch. 1 "Thermoplastics", 2000.
Final Office Action for U.S. Appl. No. 12/180,622 dated Oct. 24, 2011.
Office Action for U.S. Appl. No. 12/180,611 dated Mar. 22, 2011.
Office Action for U.S. Appl. No. 12/180,622 dated Mar. 22, 2011.
Office Action for U.S. Appl. No. 12/180,628 dated Mar. 31, 2011.
Palmer, R.J. and updated by staff 2005, Polyamides, Plastics, Kirk-Othmer Encyclopedia of Chemical Technology, Table 1, Jan. 27, 2005.
Notification of Reasons for Refusal for Japanese Application No. 2007-201193 dated Feb. 21, 2012 with English translation.
FINAL Office Action for U.S. Appl. No. 12/180,611 dated Dec. 22, 2011.

* cited by examiner

PNEUMATIC TIRE AND ITS FABRICATING METHOD

CROSS-REFERENCE TO RELATED APPLICATIONS

This application is based upon and claims the benefit of priority from the prior Japanese Patent Application No. 2007-201193, filed on Aug. 1, 2007; the entire contents of which are incorporated herein by reference.

BACKGROUND

The present invention relates to a pneumatic tire, further in details, relates to a pneumatic tire capable of providing a unique outlook by changing reflection of light at a tire outer surface after exfoliating resin films by pasting two kinds or more of the resin films having different surface roughnesses to the tire outer surface.

Generally, it is important in view of promoting a commercial value of a pneumatic tire to promote an outlook of a pneumatic tire, particularly, an outlook of a side portion and various proposals have been made in background arts.

For example, JP-A-07-096719 (KOKAI) (reference 1) proposes a pneumatic tire providing a nylon film layer on an outer side of a side wall rubber layer in order to promote an outlook of the tire as well as a weather resistance thereof. Further, JP-A-03-292205 (KOKAI) (reference 2) proposes a pneumatic tire laminating a thin film comprising polyethylene of an ultra high molecular weight to a side wall surface in order to promote an outlook while providing an ozone crack resistance.

Further, JP-A-2000-142026 (KOKAI) (reference 3) discloses that in order to promote a glossiness of a surface of a molded tire and promote an outlook of the tire, a surface of a mold is formed by shooting beads having a predetermined particle size and a tire surface a surface roughness (Ra) of which falls in a range of 1.5 through 20 μm is formed by using the mold. Further, US 2003/0230370 A1 (reference 4) discloses that in order to provide a light reflecting face along an outer surface of a tire, by using a mold having an average surface roughness less than 0.381 μm, a side wall portion of the tire is molded.

Further, JP-A-06-106921 (KOKAI) (reference 5) discloses that in order to restrain a reduction in an outlook at a side wall portion by bringing about joint dent or the like, the side wall portion is partitioned into a plurality of fan-like regions in a peripheral direction, and a difference of surface roughnesses between the fan-like regions contiguous to each other is set to be equal to or larger than 50 μm.

According to technologies disclosed in the references 3 and 4 mentioned above, by rectifying the roughness of the mold surface, a glossiness of the tire side portion is promoted, however, at the time of vulcanizing and molding a tire the mold surface is adhered with a substance bloomed from inside of rubber constituting a tire main body and is stained thereby. Therefore, the stain is transcribed to the surface of the side portion to be colored in other than black color to pose a problem of deteriorating the outlook.

Further, according to the technology disclosed in the reference 5 mentioned above, a boundary between the regions is visualized by changing the surface roughnesses between the fan-like regions contiguous to each other, thereby, a recessed and projected mark of the joint dent or the like is camouflaged to restrain a reduction in an outlook. The difference in the surface roughnesses is constituted by changing the roughness of the mold surface as well as the references 3 and 4. Therefore, a problem similar to that of references 3 and 4 is posed.

On the other hand, according to technologies disclosed in references 1 and 2 mentioned above, the resin film is provided at the outer surface of the tire side portion. However, the film is to be completely adhered to the tire main body, and therefore, the film constitutes a portion of the tire outer surface in using the tire, thereby, a weather resistance or an ozone crack resistance is promoted. Therefore, in reference 1, in order to firmly adhere the nylon film layer to the side wall rubber layer, the nylon film is subjected to a pretreatment of adherence of RFL (resorcinol formaldehyde latex) treatment or the like. Therefore, the technologies do not intend to provide the resin film at the tire outer surface to be able to be exfoliated therefrom.

Meanwhile, generally, an outer surface of a side portion of a pneumatic tire is displayed with a mark constituted by character, numeral, sign indicating maker name, brand name, tire size or the like or a diagram of a tire rotating direction, a design pattern for dressing up the side portion. The mark generally projects from the outer surface of the side portion in background art, in this case, a mark is recessed at a surface of a mold for vulcanizing and molding a tire. However, although the method of forming the mark is suitable for mass production of a tire having a mark of the same design, the method is not suitable for producing tires having marks of various designs by small lots. Therefore, a promotion of an intention for a differentiation of a user in recent years cannot be met at low cost.

SUMMARY

The invention has been carried out in view of the above-described point and it is an object thereof to provide a pneumatic tire capable of easily providing a mark at a side portion and capable of promoting an outlook.

According to a pneumatic tire of an embodiment of the invention, two kinds or more of resin films having different surface roughnesses are provided to an outer surface of a tire side portion to be able to be exfoliated therefrom by pasting two kinds or more of the resin films to an outer surface of an unvulcanized tire and vulcanizing and molding the unvulcanized tire.

Further, according to a method of fabricating a pneumatic tire according to an embodiment of the invention, two kinds or more of resin films having different surface roughnesses are pasted to an outer surface of a side portion of an unvulcanized tire, the unvulcanized tire is vulcanized and molded in a state of pasting two kinds or more of the resin films, thereby, two kinds or more of the resin films are provided at the outer surface of the tire side portion to be able to be exfoliated therefrom.

The resin film can be exfoliated from a tire main body after vulcanizing the tire and before using the tire even when retarded, and a reflectance of light at a transcribed rubber surface differ by a difference in a surface roughness of a pasted resin film. Therefore, a mark can be provided at the side portion utilizing the difference of the reflectance and an outlook can be promoted. Further, in comparison with a method of recessing a mark at a mold surface of a background art, tires having various mark designs can easily be fabricated by one mold, mold cost is saved and a tire having originality desired by a user can inexpensively be provided.

DETAILED DESCRIPTION

Figure 1:
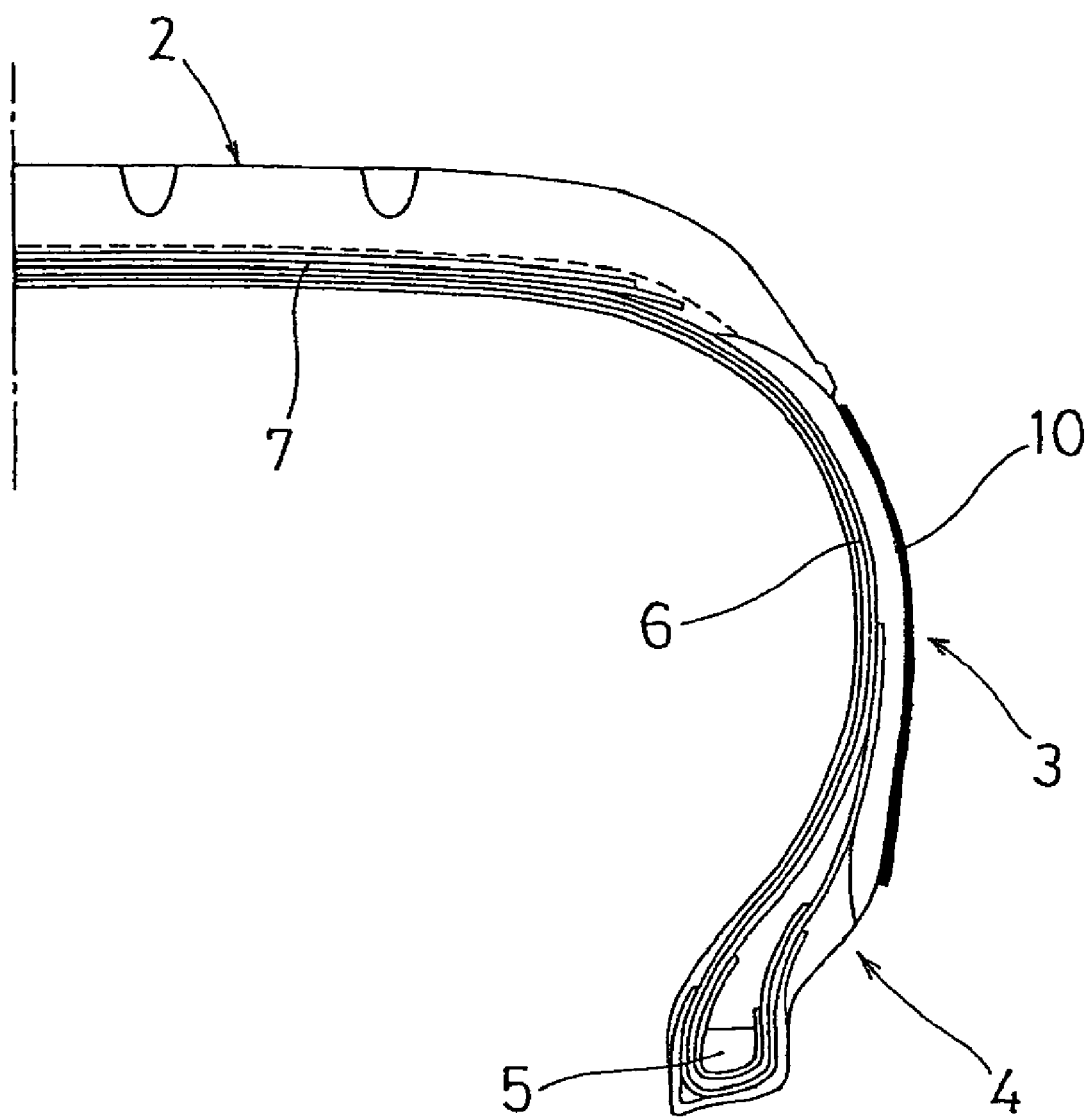
FIG. 1 is a half sectional diagram of a pneumatic tire according to an embodiment of the invention.

Articles related to an embodiment of the invention will be explained in details as follows.

According to the invention, two kinds or more of resin films having different surface roughnesses are used. As such a resin film, it is preferable to combine to use a smooth film having an arithmetic average surface roughness (Ra) equal to or less than 0.1 μm and a rough face film having an arithmetic average surface roughness (Ra) of 0.2 through 2.0 μm. A method of providing the resin films having the different surface roughnesses in this way is not particularly limited but, for example, the roughness may be produced by kneading a substance to the film, or/and, the roughness may be produced mechanically by using a roller or the like in fabricating or after fabricating the film (for example, sand mat, embossing).

A glossiness of a tire surface after exfoliating the film can remarkably be promoted by using the smooth film having the arithmetic average surface roughness (Ra) equal to or smaller than 0.1 μm, and an excellent outlook shining in black color can be provided. When the surface roughness (Ra) of the smooth film exceeds 0.1 μm, the glossiness of the tire surface is reduced, and a difference of glossinesses between the tire surface formed by the smooth film and a rubber surface formed by the rough face film is reduced to deteriorate a performance of optically recognizing the mark. Here, the arithmetic average surface roughness (Ra) is an arithmetic average roughness to a degree of recesses and projections of a surface per unit length measured in conformity with a standard of JIS B0601 (stylus type surface roughness measuring instrument) by using a stylus type surface roughness meter.

By using the rough face film having the arithmetic average surface roughness (Ra) of 0.2 through 2.0 μm, the difference between the glossinesses of the rubber surface formed by the rough face film and the rubber surface formed by the smooth film can be made to be conspicuous and the performance of optically recognizing the mark can be promoted. Further, also at the portion of pasting the rough face film, the glossiness of the rubber surface can be controlled and an outlook of the tire side portion including the mark can be promoted.

According to the resin films, it is preferable that the melting points are equal to or higher than 200° C. and it is preferable that the thicknesses are 10 through 150 μm.

When the melting point of the resin film is lower than 200° C., the heat resistance in vulcanizing a tire is inferior, the film is shrunk or the like and the glossiness of the tire surface exfoliating the resin film is deteriorated. The melting point of the film is preferably equal to or higher than 230° C. and further preferably equal to or higher than 250° C. Although an upper limit of the melting point of the film is not particularly limited and the higher the melting point the more preferable, normally, the upper limit is equal to or lower than 350° C. Here, the melting point is a value measured in conformity with DSC (differential scanning calorimeter) method of JIS K7121.

When the thickness of the film is less than 10 μm, the resin film is liable to be wrinkled in being pasted to the outer surface of the unvulcanized tire, the operability is deteriorated, and the glossiness of the tire surface after exfoliating the resin film is deteriorated by the wrinkle. Conversely, in a case of a thick film the thickness of which exceeds 150 μm, a performance of following to the rubber surface in vulcanizing and molding is poor, and the operability is inferior. The thickness of the resin film is further preferably 20 through 120 μm. Here, the thickness of the film is a value measured in conformity with JIS C2151.

Although a specific example of the resin film is not particularly limited, a polyester resin film of a polyethylene terephthalate (PET) film, a polybutylene terephthalate (PBT) film, a polyethylene naphthalate (PEN) film or the like, a fluorocarbon resin film or the like is preferably pointed out.

The two kinds or more of resin films are provided at the outer surface of the tire side portion to be able to be exfoliated therefrom by pasting the resin films to the outer surface of the unvulcanized tire and vulcanizing and molding the unvulcanized tire in the state. In details, the two kinds or more of resin films cut to predetermined shapes are pasted to predetermined positions of the outer surface of the side portion (that is, side wall portion) of the tire before being vulcanized (that is, green tire). In a state of pasting the resin films, the unvulcanized tire is vulcanized and molded at inside of a tire vulcanizing mold. Thereby, a pneumatic tire providing the two kinds or more of resin films to the outer surface of the side portion to be able to be exfoliated therefrom is fabricated.

The resin films can maintain an excellent adherence with the surface of the unvulcanized tire having a viscosity and positional shifts of the resin films in being vulcanized can be prevented. The resin films may be pasted to the unvulcanized tire before setting the unvulcanized tire to the vulcanizing mold, or/and, the resin films may be set to predetermined positions of the vulcanizing mold and the resin films may be pasted to the unvulcanized tire by closing the mold at inside of the vulcanizing mold. Preferably, the resin films are pasted to the unvulcanized tire before being set to the vulcanizing mold as in the former.

Vulcanizing and molding per se of the unvulcanized tire can be carried out in accordance with a normal method and also the structure of the vulcanizing mold is not particularly limited. Although a vulcanizing temperature is not particularly limited, vulcanization is normally carried out at 160 through 200° C.

In the pneumatic tire provided in this way, two kinds or more of resin films, particularly, the smooth film and the rough face film are provided at the outer surface of the side portion to be able to be exfoliated therefrom. That is, the resin films are pasted thereto without interposing an adhering agent or the like between the resin films and the tire surface such that the resin films can be exfoliated from the tire main body after having been vulcanized and molded.

The surfaces of the pasted resin films are transcribed to the outer surface of the tire substantially by the same surface roughnesses (Ra) by vulcanizing and molding, and therefore, the tire surface after exfoliating the resin films are provided with an extremely smooth arithmetic average surface roughness (Ra) equal to or smaller than 0.1 μm at the portion of the smooth film and is provided with an arithmetic average surface roughness (Ra) of 0.2 through 2.0 μm at the portion of the rough face film. Therefore, a mark can be provided at the side portion by utilizing a difference of reflectances of light based on the difference of the surface roughnesses. Particularly, at the rubber surface formed by the smooth film, a high glossiness can be achieved by the smoothness and excellent outlook shining in black color can be provided.

According to the method, by changing a design of the resin film, tires having various mark designs can easily be fabricated by one mold, mold cost is saved and a tire having an originality desired by a user can inexpensively be fabricated.

A mark is a display generally provided at the side portion of the pneumatic tire, which includes character, numeral, sign indicating maker name, brand name, tire size or the like or a diagram of a tire rotating direction, a design pattern for dressing up the side portion or the like.

The surface roughness (arithmetic average surface roughness Ra) of the mold is generally equal to or larger than 1.5 μm, further in details, equal to or larger than 2.0 μm, and therefore, a mark can be provided between a smooth portion formed by the smooth film and a rough face portion formed by transcribing the surface of the mold by only pasting the smooth film. However, in that case, there is a case in which the rough face portion formed by the mold surface is stained by adhering a substance bloomed from inside of rubber constituting the tire main body to the mold surface in vulcanizing and molding the tire and the stain is transcribed to the surface of the side portion to be colored by other than black color. In contrast thereto, by using the rough film along with the smooth film as described above, a design, that is, a mark can be floated up by a difference in glossinesses by one color of black color, which is excellent in an outlook.

The resin films are subjected to use of the tire by being exfoliated and a timing of exfoliation is not particularly limited. That is, the resin film may immediately be exfoliated after molding the tire, or may be exfoliated at a stage of providing the tire to an end user. Preferably, the film is exfoliated at a stage of providing the tire to an end user, thereby, adhesion of a defect or a stain in storage or transportation of the tire can be prevented.

Pneumatic tires according to a number of embodiments will be explained in reference to the drawings as follows.

First Embodiment

FIG. 1 is a half sectional view of a pneumatic tire T1 according to a first embodiment. The tire T1 is constituted by a tread portion 2, a pair of left and right side portions 3 extended from both ends thereof to an inner side in a tire radius direction, and a pair of left and right bead portions 4 continuous to inner ends of the side portions 3 and fixedly attached to a rim flange. In this example, there is shown a radial tire for a passenger vehicle including a radial structure carcass 6 a carcass ply end of which is folded back to be locked around a bead core 5 and a belt layer 7 arranged at an outer periphery of the carcass 6 in the tread portion 2.

An outer surface of the side portion 3 of the tire T1 is provided with a resin film 10 to be able to be exfoliated therefrom. As the resin film 10, in this example, the smooth film and the rough film are used.

Figure 2:
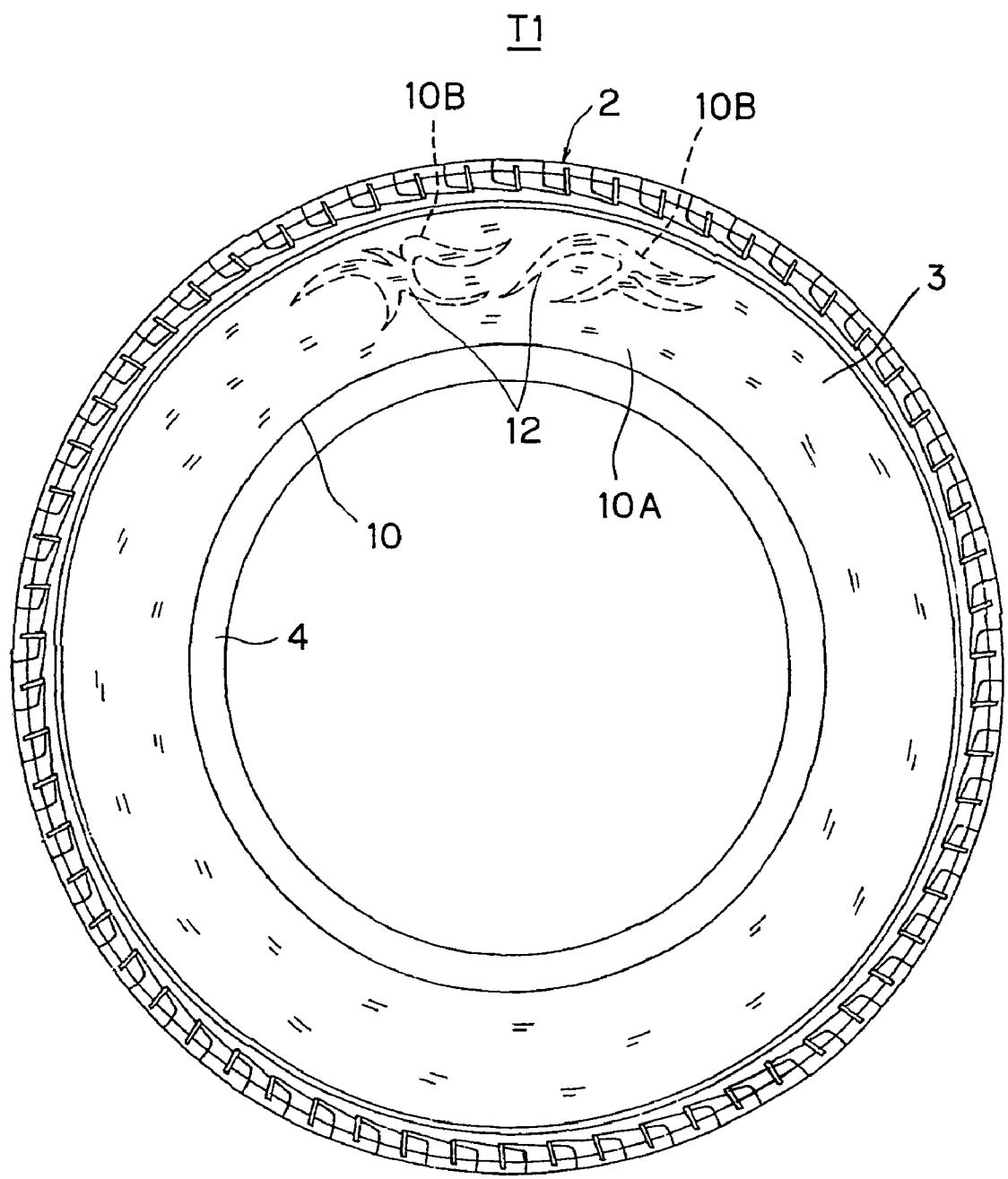
FIG. 2 is a side view of a tire according to a first embodiment.

As shown by FIG. 2, the tire T1 includes a mark 12 at the outer surface of the side portion 3, the mark 12 is formed by a rough face film 10B and a background portion of a periphery of the mark is formed by a smooth film 10A.

The smooth film 10A is provided in a ring-like shape over an entire periphery in a tire peripheral direction in substantially a total in a height direction of the side portion 3. The rough face film 10B is provided at a portion on a periphery of the smooth film 10A. In this example, the mark 12 formed by the rough face film 10B is a design pattern for dressing up the side portion 3.

Figure 3:
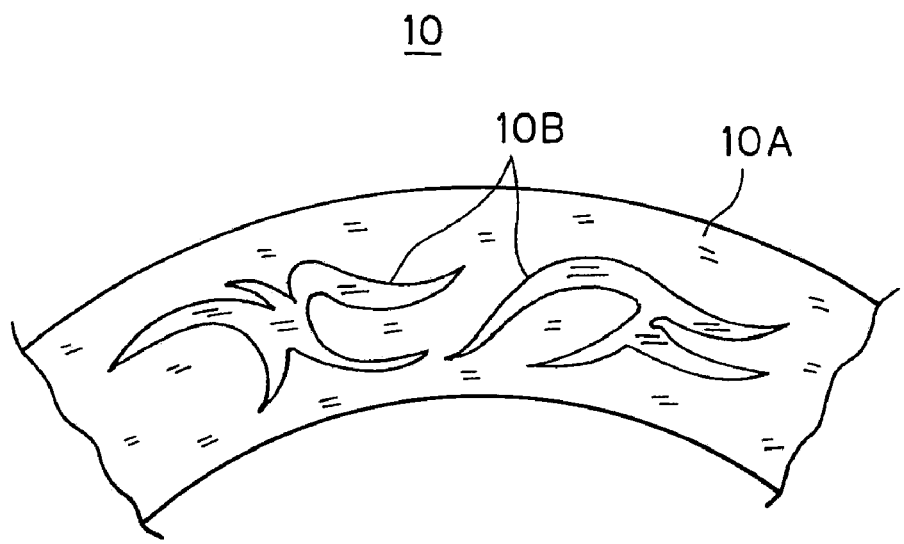
FIG. 3 is a view enlarging an essential portion of a resin film according to the first embodiment.
Figure 4:
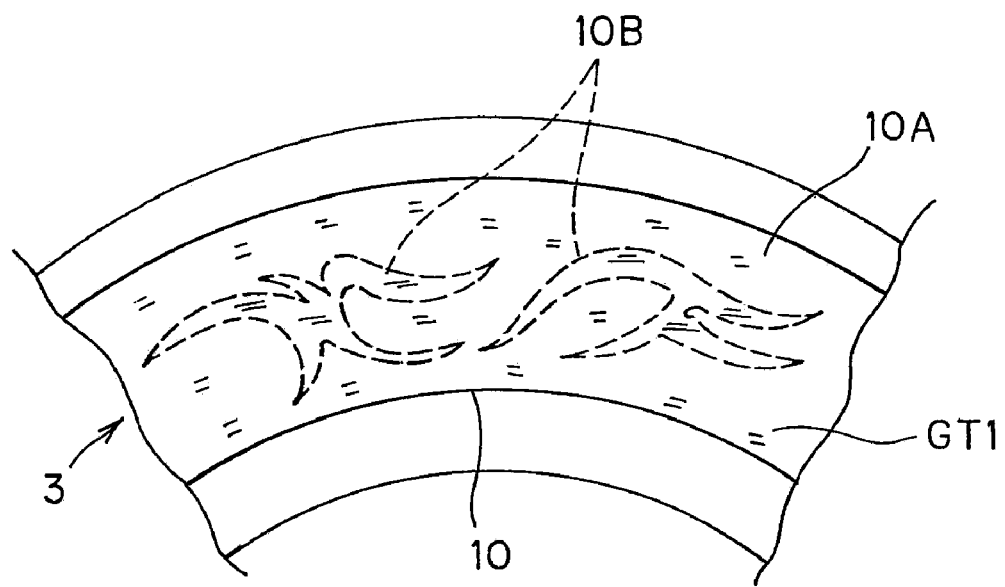
FIG. 4 is a view enlarging the essential portion showing a state of pasting a resin film to an unvulcanized tire in the first embodiment.

When the tire T1 is fabricated, the smooth film 10A cut in the ring-like shape over the entire periphery of the side portion 3 and the rough face film 10B cut along a contour of the mark 12 are prepared, as shown by FIG. 3, the rough face film 10B is adhered to a predetermined position in the peripheral direction of the smooth film 10A by using an adhering agent. The resin film 10 combined with the rough face film 10B and the smooth film 10A is pasted to the outer surface of the side portion 3 of an unvulcanized tire GT1 by directing a side adhered with the rough face film 10B to the rubber surface (refer to FIG. 4) and the unvulcanized tire GT1 is vulcanized and molded at inside of a tire vulcanizing mold in a state of pasting the resin film 10. Thereby, the tire T1 shown in FIG. 2 is provided.

The tire T1 is subjected to the use by exfoliating the resin film 10 and in a state of exfoliating the resin film 10, substantially a total of the side portion 3 is formed as a glossy portion (smooth portion) in a shape of a mirror face shining in black color by the smooth film 10A and a portion thereof on the periphery is formed with a rough face portion having a low glossiness by the rough face film 10B and the mark 12 is displayed by a difference of the glossinesses.

In this way, according to the embodiment, by providing the smooth film 10A over a wide range of the total of the side portion 3, an area of the rubber surface portion having a high glossiness after exfoliating the film is enlarged, which is excellent in effect of promoting the outlook. Further, the total of the side portion 3 is covered by the resin film 10, and therefore, the embodiment is excellent also in an effect of preventing a defect or a stain in storage or transportation of the tire from being adhered.

Second Embodiment

According to the second embodiment, in the first embodiment, the smooth film and the rough face film are constituted reversely. That is, according to the second embodiment, the mark 12 is formed by the smooth film (notation 10B in FIG. 2) and the background portion at a periphery of the mark is formed by the rough face film (notation 10A in FIG. 2). The rough face film is provided in a ring-like shape over the entire periphery of the tire peripheral direction substantially the total in the height direction of the side portion 3, and the smooth film is provided at a portion on the periphery of the rough face film. Except the above-described difference, the second embodiment is similar to the first embodiment.

Third Embodiment

Figure 5:
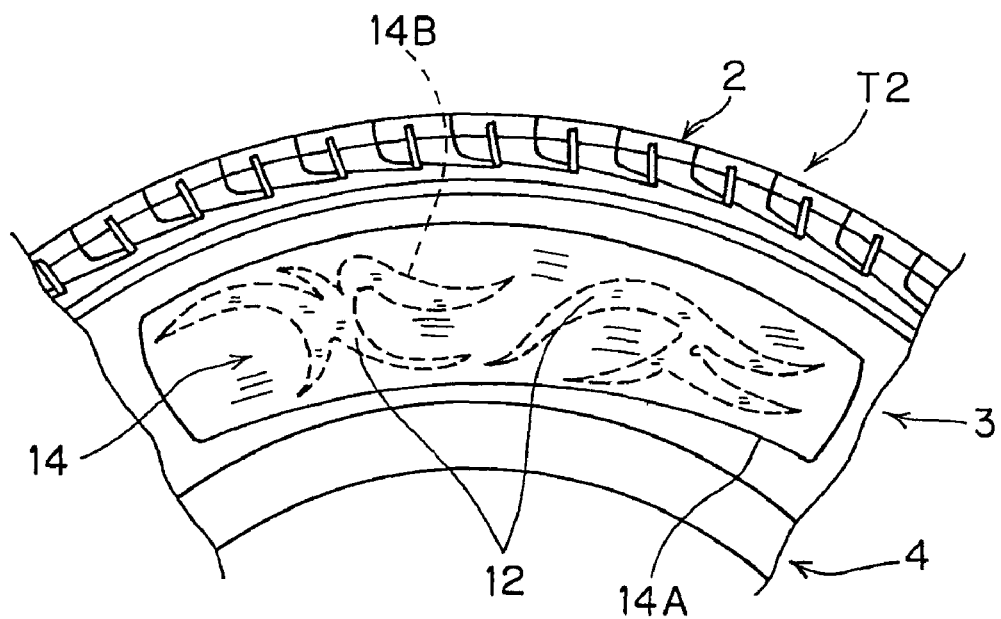
FIG. 5 is a side view of an essential portion of a tire according to a second embodiment.

FIG. 5 is a side view of a tire showing a mark display portion on an outer surface of a side portion of a pneumatic tire T2 according to a third embodiment. The embodiment differs from the first embodiment in that the resin film is provided at a portion in the tire peripheral direction. A constitution thereof except the resin film is the same as that of the first embodiment and an explanation thereof will be omitted.

In the example, a resin film 14 is constituted by a smooth film 14A in a fan-like shape provided at a portion in a tire peripheral direction of the outer surface of the side portion 3 and a rough face film 14B forming a design pattern for dressing up on the smooth film 14A. Therefore, in this example, the mark 12 is formed by the rough face film 14B and a background portion of a periphery of the mark is formed by the smooth film 14A.

Figure 6:
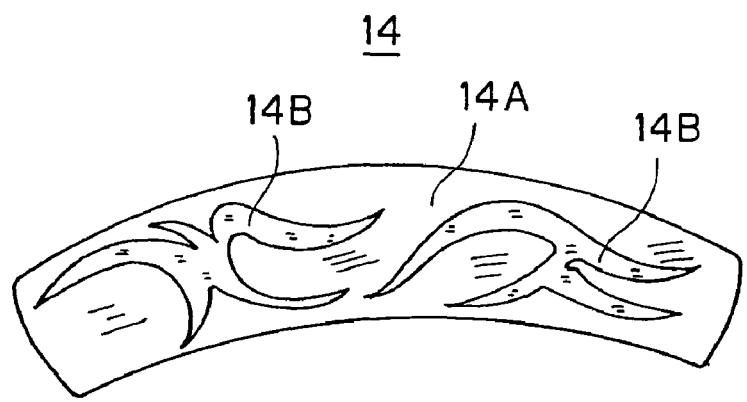
FIG. 6 is a plane view of a resin film according to the second embodiment.
Figure 7:
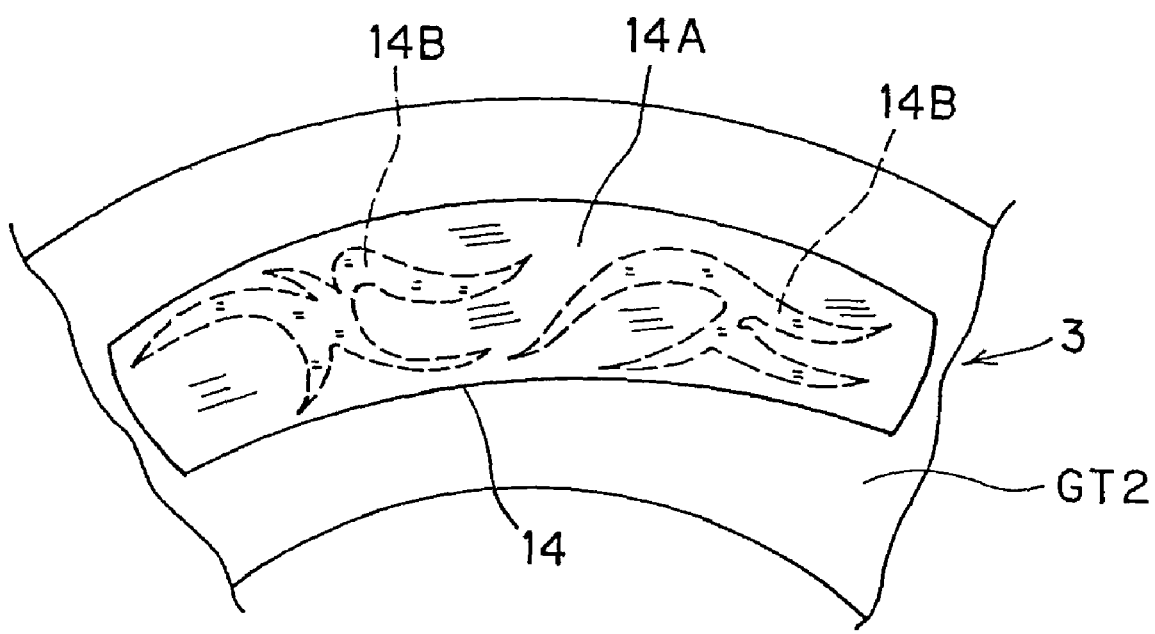
FIG. 7 is a view enlarging the essential portion showing a state of pasting a resin film to an unvulcanized tire in the second embodiment.

When the tire T2 is fabricated, the smooth film 14A cut in the fan shape and the rough face film 14B cut along the contour of the mark 12 are prepared, and as shown by FIG. 6, the rough face film 14B is adhered to a predetermined position of the smooth film 14A by an adhering agent. The resin film 14 combined with the rough face film 14B and the smooth film 14A is pasted to an outer surface of the side portion 3 of an unvulcanized tire GT2 by directing a side adhered with the rough face film 14B to the rubber surface (refer to FIG. 7) and the unvulcanized tire GT2 is vulcanized and molded at inside of the tire vulcanizing mold in the state of pasting the resin film 14. Thereby, the tire T2 shown in FIG. 5 is provided.

Although the tire T2 is subjected to use by exfoliating the resin film 14, in the exfoliating state, the side portion 3 is formed with a glossy portion (smooth portion) in a shape of a mirror face shining in black color by the smooth film 14A, and is formed with the rough face portion having the low glossiness by the rough face film 14B by constituting a background by the glossy portion and the mark 12 is displayed by a difference of the glossiness.

Fourth Embodiment

According to a fourth embodiment, in the third embodiment, the smooth film and the rough face film are reversely constituted. That is, according to the fourth embodiment, the mark 12 is formed by the smooth film (notation 14B in FIG. 5) and the background portion of the periphery of the mark is formed by the rough face film (notation 14A in FIG. 5). Except the difference, the fourth embodiment is similar to the third embodiment.

A portion of pasting the resin film is not particularly limited in a range or a size or a position thereof so far as the portion is the tire side portion. The above-described embodiment is only an example in respective shapes and arrangements of the smooth film and the rough face film.

EXAMPLES

Although examples of the invention will be shown, the invention is not limited to the examples.

As a rubber composition for a side wall, there was prepared a rubber composition by kneading by a normal method by using a Banbury mixer of a capacity of 200 L by a blending prescription constituted by natural rubber (RSS#3) 50 weight parts, butadiene rubber (made by UBE INDUSTRIES, LTD. 'UBEPOL-BR150B') 50 weight parts, carbon black FEF (made by Tokai Carbon Co., Ltd. 'SEAST SO') 60 weight parts, aroma oil (made by JAPAN ENERGY CORPORATION 'X-140') 10 weight parts, paraffin wax (made by NIPPON SEIRO CO., LTD. 'Ozoace-0355') 2 weight parts, antiaging agent 6C (made by OUCHI SHINKO CHEMICAL INDUSTRIAL CO., LTD. 'NOCRAC 6C') 2 weight parts, stearic acid (made by KAO CORPORATION 'LUNAC S-20') 2 weight parts, zinc oxide (made by MITSUI MINNING & SMELTING CO., LTD. 'zinc white No. 1') 3 weight parts, sulfur (made by Hosoi Chemical Industry Co., Ltd. '5% oil treat powder sulfur') 2 weight parts, vulcanization promoter NS (made by OUCHI SHINKO CHEMICAL INDUSTRIAL CO., LTD. 'NOCCELER NS-P') 1.5 weight parts.

A pneumatic radial tire (size: 215/60R16) applying the provided rubber composition at a side portion was trially fabricated. The trial tire was provided with a thermoplastic resin film a shape of which is shown in FIG. 3 (Examples 1 through 3, Comparative Example 2) or FIG. 6 (Examples 4, 5) and which was constituted by combining a smooth film and a rough face film described in Table 1 shown below. The film was pasted to an outer surface of a side portion of an unvulcanized tire. The unvulcanized tire was set to a tire mold made of steel in a pasted state and vulcanized and molded under a vulcanizing condition of 170° C.×20 minutes. Comparative Example 1 is an example of using only the smooth film 10A illustrated in FIG. 3.

Surface roughnesses of the respective films were measured by a method shown below. Glossinesses of rubber surfaces after exfoliating the resin films were measured for the provided respective trial tires and a design performance was evaluated. Respective measuring or evaluating methods are as follows.

[Surface Roughness]

An arithmetic average surface roughness (Ra) of a surface of a resin film is measured by using a stylus type surface roughness meter 'E-35A' made by TOKYO SEIMITSU CO., LTD. in conformity with a method of JIS B0601.

[Glossiness]

60° glossiness of a rubber surface (smooth portion formed by smooth film and rough face portion formed by rough face film) after exfoliation at a portion of pasting a resin film to a trial tire is measured in conformity with a method of JIS Z8741 by using a gloss meter 'VG2000' made by Nippon Denshoku Industries Co., Ltd. The larger the value the better the glossiness.

[Design Performance]

The tire side portion is optically observed and when a difference of glossinesses by surface roughnesses of a rubber surface caused by two kinds of films is clearly found, the design performance is evaluated as 'o' and evaluated as 'x' otherwise.

TABLE 1

| | | | | resin film | | | | |
|---|---|---|---|---|---|---|---|---|
| | shape | kind | brand name · maker | melting point (° C.) | thickness (µm) | surface roughness Ra (µm) | glossiness | design performance |
| Example 1 | FIG. 3 | (10A) PET | Toray-made lumirror S10 | 260 | 50 | 0.03 | 60 | o |
| | | (10B) PET | Toray-made lumirror X42 | 260 | 50 | 0.4 | 9 | |
| Example 2 | FIG. 3 | (10A) PET | Toray-made lumirror S10 | 260 | 50 | 0.03 | 60 | o |
| | | (10B) PET | Kimoto-made carbonfeather-X2B | 260 | 80 | 1.3 | 5 | |
| Example 3 | FIG. 3 | (10A) PET | Toray-made lumirror X42 | 260 | 50 | 0.4 | 9 | o |
| | | (10B) PET | Toray-made lumirror S10 | 260 | 50 | 0.03 | 60 | |
| Example 4 | FIG. 6 | (14A) PET | Toray-made lumirror S10 | 260 | 50 | 0.03 | 60 | o |
| | | (14B) PET | Toray-made lumirror X42 | 260 | 50 | 0.4 | 9 | |

TABLE 1-continued

| | | | | resin film | | | | | |
|---|---|---|---|---|---|---|---|---|---|
| | shape | | kind | brand name · maker | melting point (° C.) | thickness (μm) | surface roughness Ra (μm) | glossiness | design performance |
| Example 5 | FIG. 6 | (14A) | PET | Toray-made lumirror X42 | 260 | 50 | 0.4 | 9 | ○ |
| | | (14B) | PET | Toray-made lumirror S10 | 260 | 50 | 0.03 | 60 | |
| Comparative Example 1 | FIG. 3 | | PET | Toray-made lumirror S10 | 260 | 50 | 0.03 | 60 | x |
| Comparative Example 2 | FIG. 3 | (10A) (10B) | PET PET | Toray-made lumirror X44 Toray-made lumirror X42 | 260 260 | 50 50 | 0.2 0.4 | 15 9 | x |

The result is as shown by Table 1. According to the tires of the examples, the marks can be displayed by the difference of glossinesses by one color of black and outlooks were excellent. Particularly, in Examples 1 and 2, rubber surfaces having very small surface roughnesses were formed by the smooth films over substantially the total of the tires, the high glossinesses were provided, and therefore, the side portions of the excellent outlooks shining in black color were provided. In contrast thereto, according to Comparative Example 2, the surface roughness Ra of the smooth film was 0.2 μm, and therefore, the glossiness of the smooth portion of the rubber surface was inferior and the design performance, that is, the performance of optically recognizing the mark was inferior.

What is claimed is:

1. A method of fabricating a pneumatic tire, comprising pasting two kinds or more of resin films having different surface roughnesses to an outer surface of a black side portion of an unvulcanized tire, maintaining two kinds or more of resin films in contact with the outer surface of the side portion, vulcanizing and molding the unvulcanized tire while two kinds or more of the resin films are so maintained, whereby two kinds or more of the resin films are capable of being exfoliated therefrom after the vulcanizing and molding occurs, and wherein two kinds or more of the resin films are constituted by a smooth film having an arithmetic average surface roughness (Ra) equal to or smaller than 0.1 μm and a rough face film having an arithmetic average surface roughness (Ra) of 0.2 through 2.0 μm.

2. The method of fabricating a pneumatic tire according to claim 1, wherein two kinds or more of the resin films are provided with a melting point equal to or higher than 200° C. and a thickness of 10 through 150 μm.

3. The method of fabricating a pneumatic tire according to claim 1, wherein a mark is formed at the outer surface of the tire side portion by the rough face film and a background portion at a periphery of the mark is formed by the smooth film.

4. The method of fabricating a pneumatic tire according to claim 3, wherein the smooth film is provided over an entire periphery in a tire peripheral direction.

5. The method of fabricating a pneumatic tire according to claim 1, wherein a mark is formed at the outer surface of the tire side portion by the smooth film and a background portion at a periphery of the mark is formed by the rough face film.

6. The method of fabricating a pneumatic tire according to claim 5, wherein the rough face film is provided over an entire periphery in a tire peripheral direction.

7. The method of fabricating a pneumatic tire according to claim 1, wherein either the smooth film adheres to the rough face film which adheres to the side portion, or the rough face film adheres to the smooth film which adheres to the outer surface of the side portion.

8. The method of fabricating a pneumatic tire according to claim 1, wherein the outer surface of the side portion after exfoliating the resin films has an arithmetic average surface roughness (Ra) equal to or smaller than 0.1 μm at the portion after exfoliating the smooth film and has an arithmetic average surface roughness (Ra) of 0.2 through 2.0 μm at the portion after exfoliating the rough face film.

9. The method of fabricating a pneumatic tire according to claim 1, wherein the resin films are pasted directly to the outer surface of the side portion of the unvulcanized tire without interposing an adhering agent.

10. The method of fabricating a pneumatic tire according to claim 1, wherein the resin films are pasted to the outer surface of the side portion of the unvulcanized tire, and the unvulcanized tire is then set to the vulcanizing mold.

11. The method of fabricating a pneumatic tire according to claim 1, wherein the resin films are set to predetermined positions of the vulcanizing mold, and the resin films are then pasted to the unvulcanized tire by closing the mold at inside of the vulcanizing mold.

* * * * *